United States Patent
Paap et al.

[15] 3,681,601
[45] Aug. 1, 1972

[54] WELL LOGGING SYSTEM

[72] Inventors: Hans J. Paap; Robert W. Pitts; Allen H. Mueller, all of Houston, Tex.

[73] Assignee: Texaco Inc., New York, N.Y.

[22] Filed: June 1, 1970

[21] Appl. No.: 41,728

Related U.S. Application Data

[63] Continuation of Ser. No. 641,853, May 29, 1967, abandoned.

[52] U.S. Cl......250/83.3 R, 250/71.5 R, 250/836 W, 307/247, 307/268, 307/290, 307/293, 324/103 P, 328/151
[51] Int. Cl..............................G01v 5/00, G01t 1/17
[58] Field of Search..............250/83.6 W, 83.3, 71.5; 307/235; 324/103 P; 328/151

[56] References Cited

UNITED STATES PATENTS

| | | | |
|---|---|---|---|
| 2,837,639 | 6/1958 | Gray et al. | 250/71.5 |
| 2,968,724 | 1/1961 | Clark | 250/83.6 W |
| 3,234,472 | 2/1966 | Ebeling et al. | 328/151 |
| 3,334,306 | 8/1967 | Jensen | 328/151 |
| 3,428,829 | 2/1969 | Haynie et al. | 328/151 |

*Primary Examiner*—James W. Lawrence
*Assistant Examiner*—Morton J. Frome
*Attorney*—K. E. Kavanagh, Thomas H. Whaley and Robert J. Sanders, Jr.

[57] ABSTRACT

A system for logging a borehole traversing earth formations wherein a logging tool, or sonde, connected to the end of an electrical cable traverses the borehole; the sonde containing nuclear or radioactivity logging apparatus such as, for example, a scintillation detector including a photomultiplier and associated circuitry for generating output information signals representative of at least one parameter (e.g., nature of subsurface formations or strata) determined in the borehole. The output information signals initially generated in the sonde are electrical pulses having a short-duration as well as short rise and short decay times. However, after being transmitted along the cable from the sonde to the earth's surface these pulses become distorted into pulses having a long duration attenuated amplitude, long rise and long decay times. Herein disclosed is a pulse shaping network, located at the earth's surface, to restoring the amplitude, duration, rise and decay times of the pulses so that the reshaped pulses can be fed to, inter alia, a pulse height analyzer whereby useful logging information may be derived from the reshaped pulses in correlation with the depth of the sonde in the borehole.

3 Claims, 15 Drawing Figures

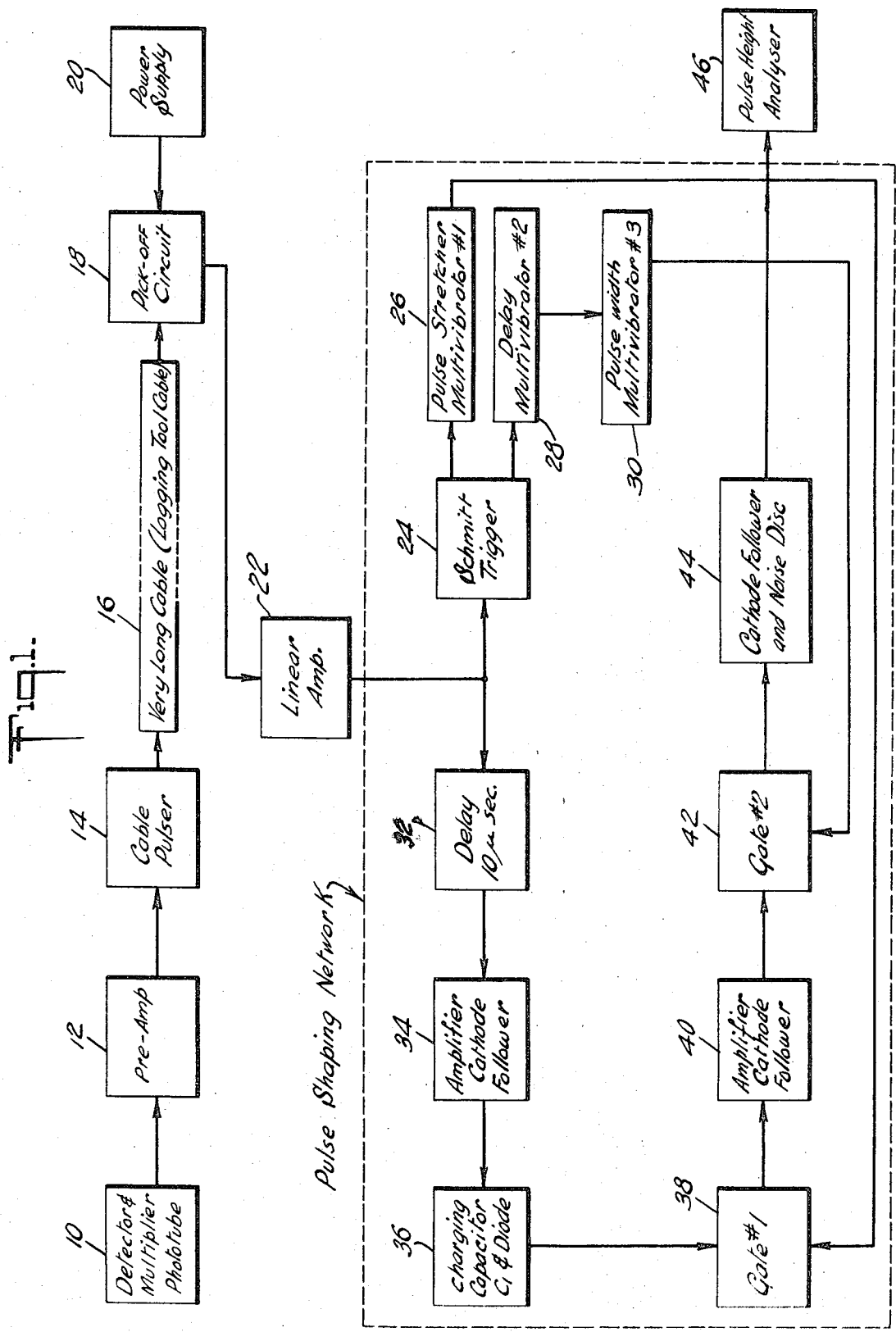

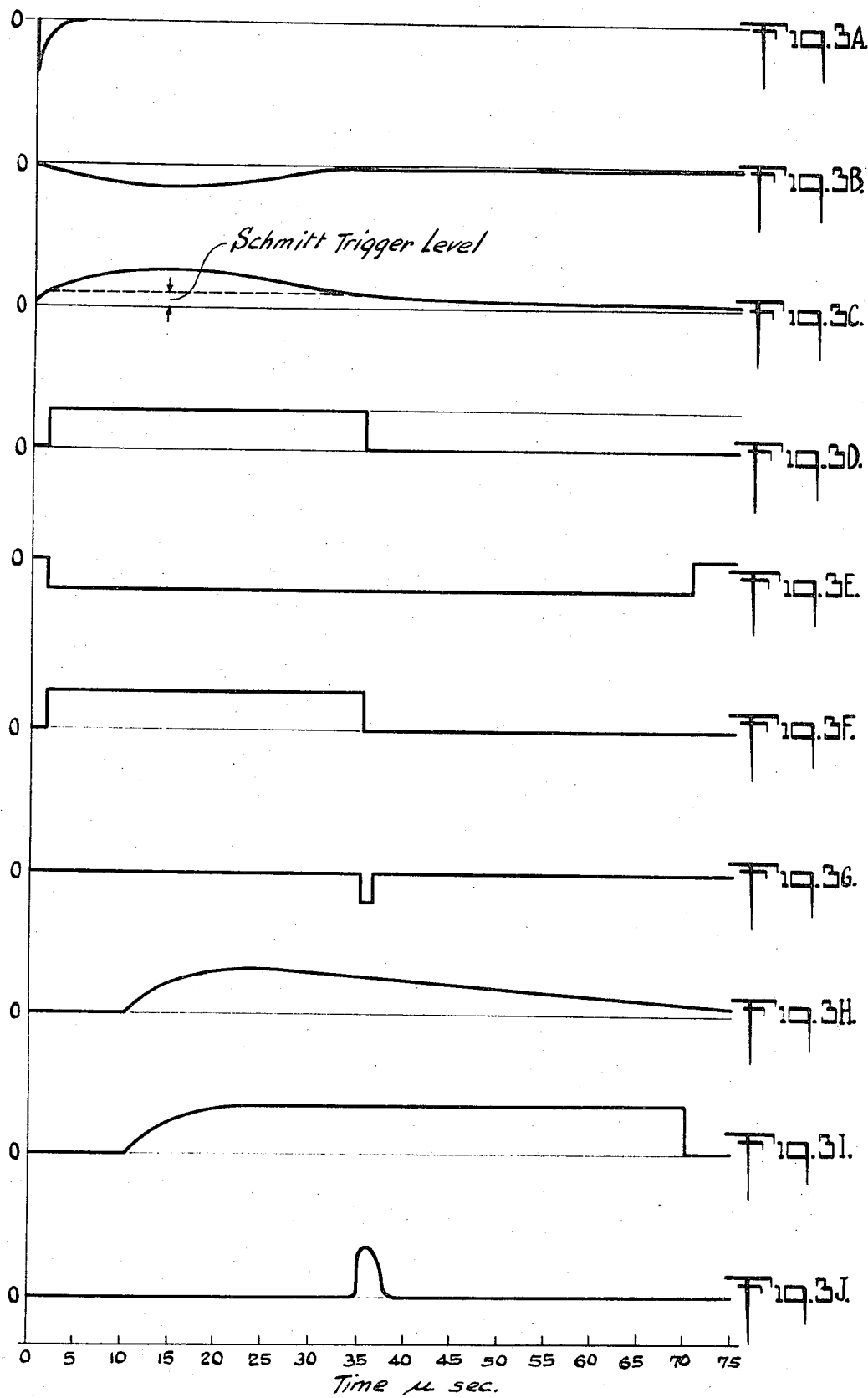

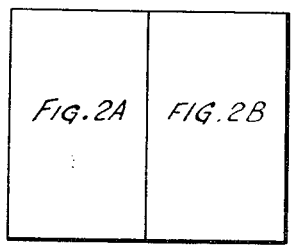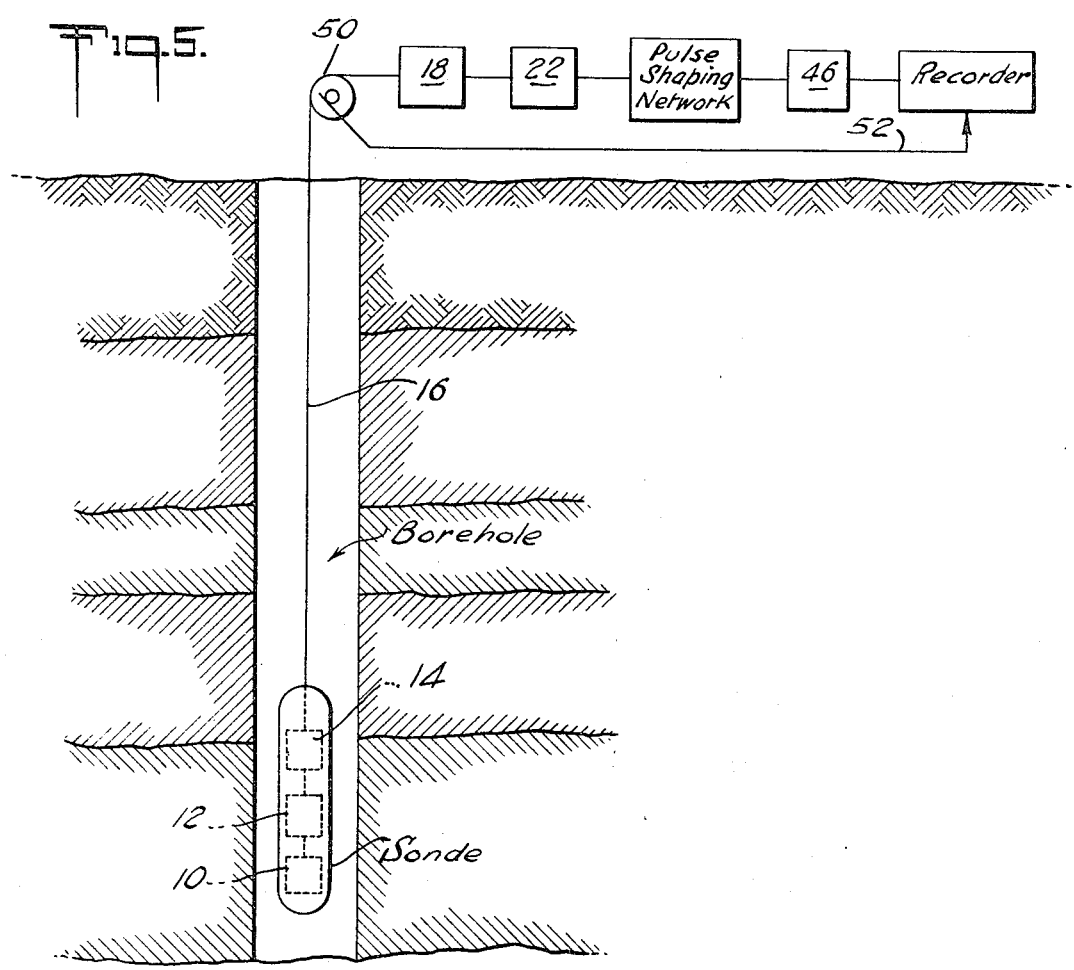

WELL LOGGING SYSTEM

This case is a continuation of application No. 641,853 filed May 29, 1967, now abandoned.

BACKGROUND OF THE INVENTION

This invention pertains to well logging systems of the type in which a logging tool, or sonde, connected to an end of an electric cable, or transmission line, traverses a borehole in the earth and sends information signals, representative of at least one parameter determined in the borehole, upwardly on the cable to the earth's surface for interpretation in correlation with the depth of the sonde in the borehole; and, more particularly, to the reshaping and thereby restoring useful information to the information signals which have been distorted by virtue of their having been transmitted over a cable, or transmission line, from the sonde deep in the borehole by pulse generating apparatus such as, for example, the photomultiplier of a sodium iodide scintillation detector in the sonde.

When information signals in the form of short duration pulses having short rise times and short decay times are transmitted over transmission lines or cables of appreciable length their shapes are changed. In general, at the receiving end (earth's surface) of the cable, or transmission line, the amplitude of each pulse is attenuated. Moreover, the rise time, decay time and duration of each pulse is increased. Even though the aforementioned distortion occurs there exists a linear relationship between the amplitude of the input pulse and that of the output pulse; i.e., the amplitude of the pulse appearing at the transmission end (sonde) of the cable and the amplitude of the pulse appearing at the receiving end (earth's surface) of the cable. The aforesaid linear relationship holds true with respect to the short duration, fast rising and fast decaying pulses generated by scintillation detector equipment located in a borehole and transmitted over a conventional logging cable of up to 20,000 feet in length. As a typical example, pulses generated by the photomultiplier of a sodium iodide scintillation detector have rise times of less than a half microsecond and a duration of 2 microseconds. After such a pulse has been transmitted over a 20,000 foot well logging cable its rise time has increased to approximately 15microseconds and its duration has increased to well over 100 microseconds. Most commercially available, off-the-shelf, pulse height analyzers cannot accept such pulse shapes for analysis. An example of one that cannot accept such pulse shapes is the Technical Measurements Corporation 400 channel pulse height analyzer. In fact, the recommended pulse shape for the aforementioned pulse height analyzer is a pulse having a rise time of 0.3 microsecond and a 3 microsecond decay time.

SUMMARY OF THE INVENTION

One object of the invention is to reshape pulses which have been distorted after having traversed a cable or transmission line and thereby restore to the pulse the useful information originally contained therein.

Another object of the invention is to transform or reshape pulses of long duration and long rise and decay times into pulses of short duration, short rise times and short decay times.

Another object of the invention is to provide a pulse shaping circuit or network which can accept long duration pulses having long rise and decay times and reshape these pulses into short duration pulses having short rise and decay times without, however, losing the information inherent in the peak amplitude of the pulses.

Another object of the invention is to provide a pulse shaping circuit or network for reshaping distorted pulses and thereby to restore useful information to these pulses so that said reshaped pulses may be in a form suitable for analysis in a pulse height analyzer.

Another object of the invention is to reshape distorted pulses initially generated by a scintillation detector so that said reshaped pulses may be in a form suitable for analysis in a pulse height analyzer, especially in connection with nuclear well logging operations.

Another object of the invention is to provide a method for processing a distorted signal in order to restore the useful information thereto that said signal initially contained in its original non-distorted form.

Briefly, in accordance with an illustrative embodiment of the invention there is provided a system for logging a borehole traversing earth formations wherein a sonde, containing means for generating information signals representative of at least one parameter determined in the borehole, is passed along the borehole. A cable, or transmission line, distorts and conducts said signals to the earth's surface where there is located, inter alia, a network for reshaping the pulse and thereby restoring the initial information thereto.

Other objects and advantages, as well as the many features of the invention, will become apparent from a study of the detailed description, hereinafter set forth, and the drawings illustrating one embodiment of the invention.

BRIEF DESCRIPTION OF THE DRAWINGS

FIG. 1 is a block diagram including the pulse shaping circuit or network embodied in the invention;

FIGS. 3A through 3J are waveforms or shapes of the voltage pulses at various points in the block and schematic diagrams of FIGS. 1 and 2.

FIG. 4 is a diagram showing how the drawing sheets FIGS. 2A and 2B are to be matched; and, FIG. 5 is a schematic diagram of the overall logging system according to the invention.

DESCRIPTION OF THE PREFERRED EMBODIMENT

Figure 2A:
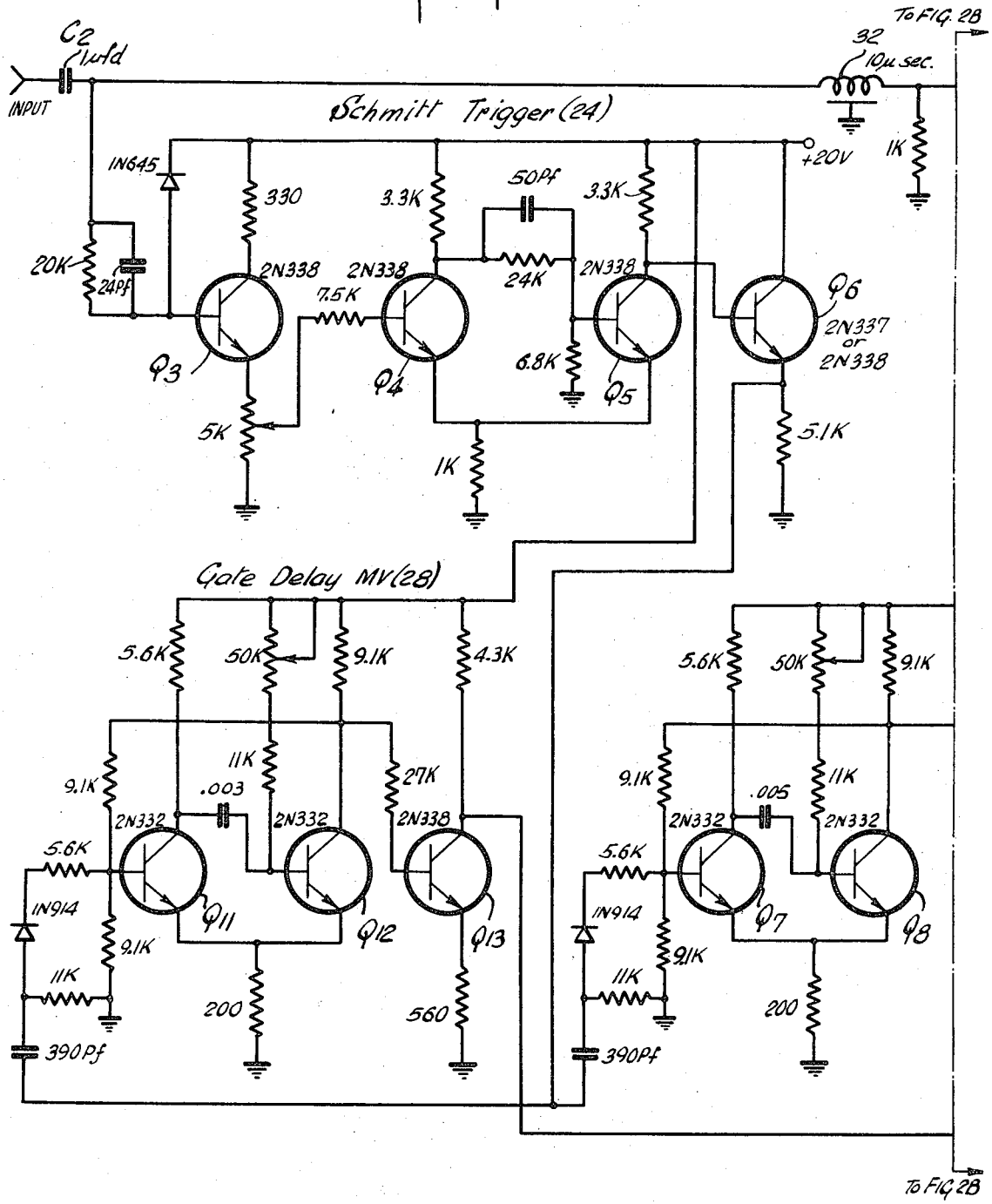
FIGS. 2A and 2B together when matched as shown in FIG. 4 is a schematic diagram showing a specific illustrative embodiment of a pulse shaping circuit or network in accordance with the invention.

In FIG. 1 there is illustrated a block diagram of a nuclear well logging system and it includes a pulse shaping circuit, or network, and said circuit, or network, is for the purpose of delivering a suitably shaped pulse to, among other things, a pulse height analyzer, which is designated, generally, by the reference number 46.

As shown a multiplier phototube or photomultiplier 10 is provided. The photomultiplier 10 is located deep within a well borehole and is part of a nuclear logging tool, or sonde, which is coupled to the end of a rather lengthy (e.g., 20,000 feet) transmission cable 16. Photomultiplier 10 generates an output voltage pulse in response to excitation by a suitable scintillation detector coupled therewith such as, for example, a sodium iodide scintillation detector or the like. The output voltage pulse delivered by the photomultiplier 10 has the general waveform or shape illustrated in FIG. 3A. The pulse of FIG. 3A has, as shown, a short duration of approximately 2 microseconds and it has a very short rise time as well as a relatively short decay time. The output pulse from photomultiplier 10 is subsequently amplified in a pre-amp 12 and then it is fed to a cable pulser 14 from which it is then delivered to the transmission end of the long cable 16. In essence, the pre-amp 12 and cable pulser 14 perform the functions of impedance transformation and power amplification in order to match and drive the long low impedance cable. Coupled to the receiving end (at the earth's surface) of the logging cable 16 is a suitable pick off circuit 18 and a power supply 20. The pick off circuit 18 functions to separate the information signal pulse from the electrical energy of the power supply 20 and deliver the pulse to a linear amplifier 22.

After transmission along the cable 16 the initial pulse, shown in FIG. 3A, becomes distorted. It now has the general waveform or shape illustrated in FIG. 3B. As shown, the pulse has a long duration and it has a long rise time as well as a long decay time. Moreover, the peak amplitude of the pulse has been attenuated by a factor of 100 relative to the peak amplitude of the pulse which was initially delivered to the cable 16. In other words the peak pulse amplitude is attenuated to about 1/100 of the initial amplitude. However, there is a linear relationship between the peak amplitudes of the input and output pulses.

After leaving the receiving end of the cable 16 and the pick off circuit 18, the pulse (having the general shape shown in FIG. 3B) is processed through a conventional linear amplifier 22. Tracerlab Inc. RL-1 amplifier is suitable for the linear amplifier 22. The output of the linear amplifier 22 is an amplified long duration pulse having a long rise time and a long decay time and it has the general waveform or shape illustrated in FIG. 3C. The amplified pulse of FIG. 3C is then fed in parallel and simultaneously to a Schmitt trigger circuit 24 and to a delay line 32. In the illustrative embodiment of the invention the delay line 32 provides a 10 microsecond delay.

The Schmitt trigger 24 shapes the input pulse (FIG. 3C) before it is sent to two multivibrators 26 and 28 shown in FIG. 1. Moreover, the Schmitt trigger 24 functions as a variable discriminator for the input pulses it receives. The Schmitt trigger output pulse has the shape shown in FIG. 3D. The Schmitt trigger output pulse (FIG. 3D) has a duration which lasts as long as the amplitude of the output pulse of FIG. 3C is above the Schmitt trigger level. The output of the Schmitt trigger 24 is as shown in FIG. 1 fed to the parallelly arranged multivibrators 26 and 28 to trigger them. Multivibrator 26 is a monostable multivibrator and it stretches its input pulse (FIG. 3D) to a pulse of longer duration; the output pulse from multivibrator 26 being shown at FIG. 3E. The multivibrator 28 is also a monostable multivibrator and it is interposed for the purposes of delaying the output pulse received from the Schmitt trigger 24. The output pulse, shown at FIG. 3F, from the multivibrator 28 is fed to another monostable multivibrator 30. Multivibrators 26 and 28 are triggered by the leading edge of the output pulse 3D from the Schmitt trigger 24 and, moreover, the length, or duration of the output pulse (FIG. 3E) from multivibrator 26 is adjusted so as to be longer than the input pulse 3C. The pulse of FIG. 3E sets the stretch time for the input pulse of FIG. 3C. The monostable multivibrator 28 sets the time for the triggering of the multivibrator 30 and the latter multivibrator provides an output pulse having the general shape shown in FIG. 3G. As indicated in FIGS. 3F and 3G, the trailing edge of the pulse 3F causes the initiation of the pulse of FIG. 3G. As indicated in FIG. 1 the output pulse (FIG. 3E) from the multivibrator 26 is fed to a first gate circuit 38 and the output pulse (FIG. 3G) from the multivibrator 30 is fed to a second gate circuit 42.

The output pulse (shown in FIG. 3C) of linear amplifier 22 is fed simultaneously to the delay circuit 32 and to the Schmitt trigger 24. After being delayed in the delay circuit 32, the pulse is then fed to a cathode follower amplifier 34. The output voltage waveform or pulse from the cathode follower 34 is shown in FIG. 3H. It is to be noted that there is a 10 microsecond delay before this pulse begins to rise. This is due to the action of the delay line or delay circuit 32 hereinbefore mentioned. The output pulse (FIG. 3H) from cathode follower 34 is then fed to a charging capacitor C1 and a diode V1, designated in FIG. 1 by the reference number 36, which are controlled by a first gate circuit 38 (transistor Q1 in FIG. 2B). The charging capacitor C1, diode V1 and first gate circuit 38 (or transistor Q1, FIG. 2B) form a pulse stretching network and this network is discussed in detail hereinafter with reference to FIGS. 2A and 2B. The first gate circuit 38 controls the output from diode V1 and charging capacitor C1 to another cathode follower amplifier 40. The output from cathode follower 40 has the general waveform or shape shown in FIG. 3I. The output pulse (FIG. 3I) from the second gate circuit 42 (or transistor Q2 in FIG. 2B) is fed to a cathode follower and noise discriminator network 44. The output pulse from the network 44 is shown in FIG. 3J. This pulse is ultimately fed to the pulse height analyzer 46.

In the static state the first gate circuit 38 clamps the charging capacitor C1 to ground potential. However, just before the arrival of the voltage pulse from cathode follower 34 (the pulse shown in FIG. 3H) at the diode V1, the clamping action of the gate 38 is disabled by the pulse from the multivibrator 26; i.e., the pulse shown in FIG. 3E. As a result of the disabling of the gate 38 the charging capacitor C1 now charges through the diode V1 to the peak value of the pulse from the cathode follower 34 and the charging capacitor C1 is maintained at such a voltage peak for the duration of the gating pulse from the multivibrator 26.

As a result, the stretched pulse shown in FIG. 3I, as amplified by the cathode follower 40, is delivered to the second gate circuit 42 and to the network 44. The second gate circuit 42 clamps an input grid of the cathode follower section of network 44 to ground potential regardless of the potential of the cathode of the preceding cathode follower 40. The clamping action of the second gate circuit 42 is, however, disabled by the gating pulse (FIG. 3G) from the multivibrator 30. For a duration of time equal to that of the width of the pulse delivered by the multivibrator 30 the cathode voltage of the cathode follower section of network 44 will rise to the peak potential of the initial input pulse (FIG. 3I) from a potential slightly above the ground potential corresponding to the grid to cathode potential. As will appear with reference to the discussion of FIG. 2, a biased diode $D_2$ and zero suppression potentiometer allow only pulses of the shape shown in FIG. 3J to be delivered to the pulse height analyzer 46.

Figure 2B:
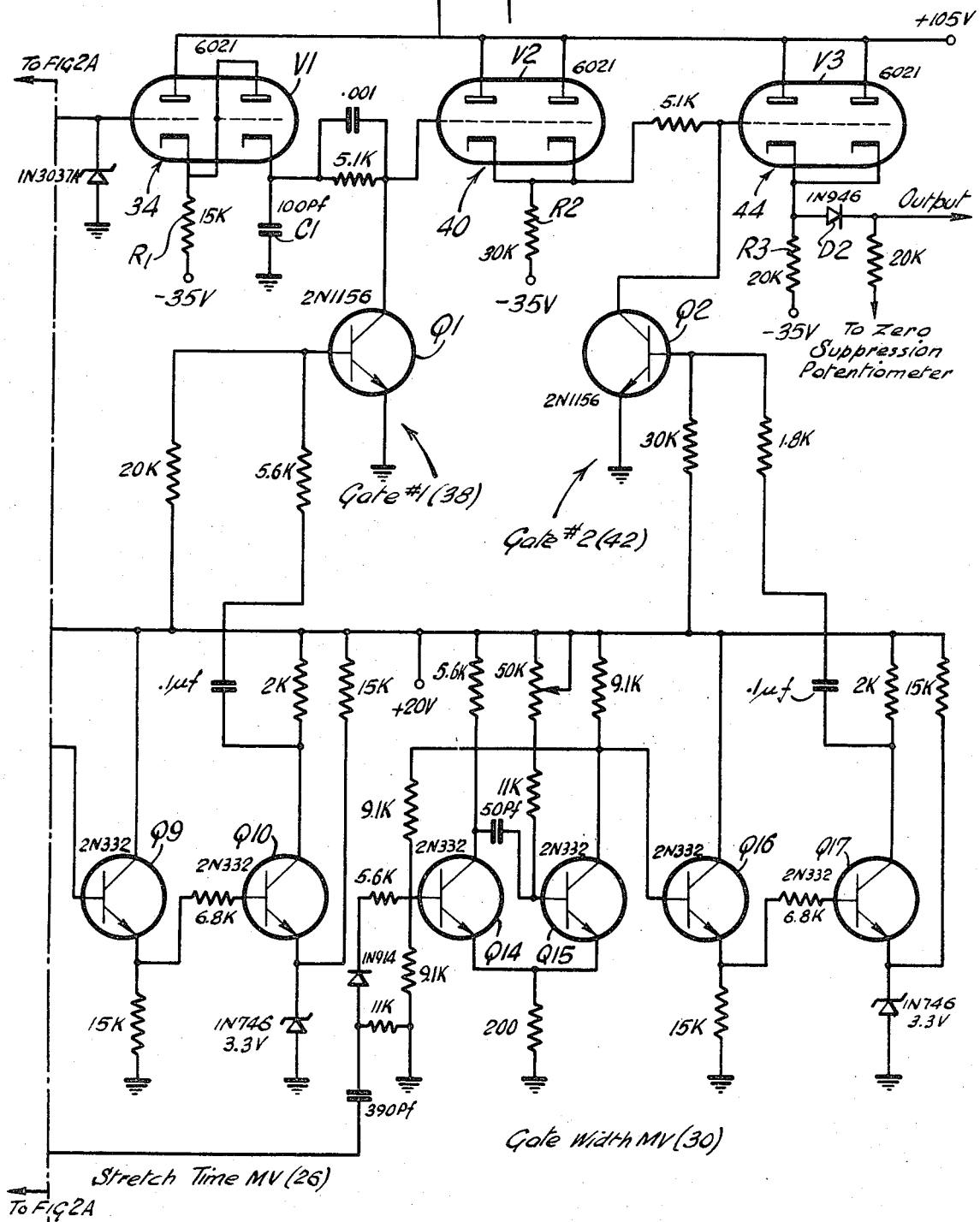

In FIG. 1 the pulse shaping network or circuit according to the invention is shown within the space defined by the dash lines and is labelled as such. A practical working embodiment of this pulse shaping circuit or network is shown schematically in FIGS. 2A and 2B. As shown in FIGS. 2A and 2B the incoming pulse (FIG. 3C) from the amplifier 22 is coupled through a capacitor C2 to delay network 32 which functions to delay the pulse for a period of 10 microseconds. Also, simultaneously, the incoming pulse (FIG. 3C) is routed to the base electrode of a transistor Q3 which together with the various electrical elements (resistors, capacitors, diode and potentiometer) connected to the electrodes thereof, as shown in FIG. 2A, from an amplitude discriminator stage of the Schmitt trigger circuit 24. The Schmitt trigger, designated generally by the reference number 24, is principally comprised of three transistors Q4, Q5 and Q6 which are connected in the manner shown in FIG. 2A. The output voltage pulse (FIG. 3D) at the emitter electrode of transistor Q6 is fed to the multivibrators which are designated generally by the reference numbers 26 and 28; the former and latter being labeled in FIGS. 2A and 2B as STRETCH TIME MV and GATE DELAY MV, respectively. The multivibrator 26 is principally comprised of the transistors Q7, Q8, Q9 and Q10. They are electrically connected in the manner shown in FIGS. 2A and 2B. The long duration output voltage pulse (FIG. 3E) from multivibrator 26 controls the first gate circuit 38 or, more specifically, the base electrode of the transistor Q1. The multivibrator 28 is principally comprised of the transistors Q11, Q12 and Q13 which are electrically connected in the manner shown in FIG. 2A. The output voltage pulse (FIG. 3F) from the transistor Q13 is fed to the input of multivibrator 30 which is labeled in FIG. 2B as GATE WIDTH MV. The multivibrator 30 is principally comprised of the transistors Q14, Q15, Q16 and Q17. These transistors are, connected in the manner shown in FIG. 2B. As indicated, the output voltage pulse (FIG. 3G) from the transistor Q17 controls the gate 42 or, more particularly, the base electrode of the transistor Q2.

After the amplified but distorted pulse of FIG. 3C has been delayed 10 microseconds by the delay network 32 it is amplified in cathode follower amplifier 34 which in FIG. 2B is essentially the first stage triode of a twin triode vacuum tube; the second stage being used as a diode VI. As shown, the output voltage (FIG. 3H) is taken from the cathode of the first stage triode; i.e., the potential across the resistor R1. Since the grid and plate of the second stage triode section are connected together, the configuration becomes a diode identified in FIG. 2B as VI.

Prior to the charging of capacitor C1 by diode VI the clamping action of gate transistor Q1 is removed from capacitor C1 and then C1 is charged to the peak voltage of the pulse of FIG. 3H. The voltage across the capacitor C1 is applied to a cathode follower amplifier designated generally by the reference number 40 in FIG. 2B. As shown, the cathode follower amplifier 40 is comprised of another twin triode vacuum tube V2 and the resistor R2 which is connected between both commonly-connected cathodes of the tube V2 and a source of negative potential as indicated in FIG. 2B. The output voltage (FIG. 3I) appearing across the resistor R2 is gated by the transistor Q2 to another cathode follower amplifier, designated generally by the reference number 44 in FIG. 2B. The gating transistor Q2 is driven by the multivibrator 30. The cathode follower amplifier 44 is comprised of another twin triode vacuum tube V3 and the resistor R3 which, as shown, is connected between both commonly-connected cathodes of the tube V3 and a negative source of voltage. The output appearing across resistor R3 of cathode follower amplifier 44 is fed to a noise discriminator circuit which is comprised of the reverse biased diode D2 and the resistor R4 which, as indicated, is coupled to the potentiometer arm of a zero suppression potentiometer.

In the static state transistor Q1 clamps the charging capacitor C1 to ground potential. However, immediately prior to the arrival of a voltage pulse at diode VI the clamping action of transistor Q1 is disabled by the pulse (FIG. 3E) from the multivibrator 26. With the clamping action of transistor Q1 so disabled the capacitor C1 charges through the diode VI to the peak voltage (FIG. 3H) delivered by cathode follower amplifier 34; i.e., the voltage across resistor R1. The charging capacitor C1 is kept at this peak voltage for the duration of the pulse (FIG. 3E) delivered by multivibrator 26. The voltage across capacitor C1 is shown in FIG. 3I. This pulse, which has been stretched in time, is delivered to cathode follower amplifier 40 or, more specifically, to the vacuum tube V2. The output voltage from cathode follower amplifier 40 appears across the resistor R2 and is fed to the gating transistor Q2 and to cathode follower amplifier 44 or, more particularly to the vacuum tube V3. The transistor Q2 or second gate circuit 42 clamps the input grid of cathode follower amplifier 44, or vacuum tube V3, to ground potential regardless of the voltage at the cathode of the vacuum tube V2 of the preceding cathode amplifier 40. The clamping action of transistor Q2 is disabled by the short duration voltage pulse (FIG. 3G) delivered thereto by multivibrator 30. For a duration of time corresponding to the duration of the pulse of FIG. 3G the cathode voltage of vacuum tube V3 will rise to the peak voltage of the initial input pulse from a voltage slightly above ground potential corresponding to the grid to cathode potential. A diode D2 which, as shown, is reverse biased and a zero suppression potentiometer (labeled in FIG. 2B) will pass only pulses exceeding a predetermined potential level set by the potentiometer. This eliminates any pedestal on which the pulses may ride. The voltage pulse appearing at the output of the pulse shaping circuit or cathode of the diode D2 has an amplitude linearly related to that of the initial input pulse of FIG. 3A and it has a duration or width equal to that of the pulse (FIG. 3G) delivered by the multivibrator 30.

Advantageously, the pulse duration or width of the output pulses from the three multivibrators are independently adjustable to accommodate variety of pulse shapes. The multivibrator 26 allows time for the charging capacitor C1 to charge to the peak voltage of the initial pulse. Multivibrator 28, in effect, sets the time for the triggering of multivibrator 30. Hence, when the charging capacitor C1 has charged to the peak voltage the multivibrator 28 cuts off and multivibrator 30 is turned on. The pulse width of the multivibrator 30 is set at approximately 2 microseconds for use with the Technical Measurement Company's 400 channel analyzer. The Schmitt trigger circuit 24 is used to shape the pulse going to the multivibrators 26 and 28 and also as a variable amplitude discriminator for the input pulses thereto. The delay network 32 provides a 10 microsecond time delay and is necessary when the Schmitt trigger 24 is used as a discriminator, the 10 microsecond delay being chosen according to the rise time of the initial pulse.

In FIGS. 2A and 2B the various electrical elements shown in the schematic diagram are labeled as to their ratings and/or types. It is to be understood that this has been done for the purpose of illustrating a specific working embodiment of the pulse shaping network or circuit of the invention and not for purposes of limiting the scope of the invention.

In FIG. 5 there is illustrated the overall operational aspect of the logging system according to the invention. As shown, a SONDE at the lower end of the cable 16 is located within an earth BOREHOLE which traverses various strata, or earth formations. At the earth's surface the cable 16, which may be a coaxial cable or a multi-conductor cable, is connected to the pick-off circuit 18. The pick-off circuit feeds the distorted pulse to linear amplifier 22 from whence the pulse is delivered to the PULSE SHAPING NETWORK and thereafter to the pulse height analyzer 46 and a RECORDER. In order to correlate the position of the SONDE in the borehole during the logging operation there is located at the earth's surface a measuring apparatus, represented diagrammatically by the wheel 50 having its perimeter in contact with cable 16, for sensing movement of the cable 16 in and out of the borehole. Apparatus 50 may be any of the known devices for depth determination of the sonde in the borehole and may, advantageously, be of the type which provides an electrical output signal transmitted by means of a conductive path 52 to the recorder for correlating the recorded logging or information signal with the depth of the sonde in the borehole throughout the logging operation.

It is to be understood by those skilled in the art that the present invention is employed in nuclear or radioactivity well logging apparatus including a radiation detector and auxiliary equipment including rate meters, recorders, etc.; e.g., such as are disclosed in U.S. Pat. No. 3,240,938 issued Mar. 15, 1966 to H. E. Hall, Jr.

While there has been shown and described one more or less specific embodiment of the invention it is to be understood that this has been done for purposes of illustration only and that the scope of the invention is not be limited thereby but it is to be determined from the appended claims.

What is claimed is:

1. A system for logging a borehole which traverses earth formations comprising: a sonde adapted to be passed along the borehole, said sonde including means for generating a short-duration, fast rising and fast decaying first pulse having an amplitude representative of at least one parameter determined in the borehole; a transmission line having a sending end, coupled to the means for generating the initial pulse, and a receiving end located at the surface of the earth, the first pulse being introduced at said sending end and distortedly transmitted along said line to said receiving end at which latter end the first pulse is received as a distorted long-duration, slow rising and slow decaying second pulse having an attenuated amplitude; a linear amplifier for amplifying the second pulse and thereby producing an amplified distorted third pulse; a Schmitt trigger responsive to the third pulse for producing a long-duration fourth pulse; a first multivibrator responsive to the fourth pulse for producing a fifth pulse; a second multivibrator responsive to the fourth pulse for producing a sixth pulse; a third multivibrator responsive to the sixth pulse for producing a seventh pulse; delay means for translating the third pulse in the form of a time-delayed eighth pulse; a first cathode follower amplifier for amplifying the eighth pulse and thereby producing a ninth pulse; storage means for storing a potential having a magnitude substantially equal to the peak amplitude of the ninth pulse; first gating means responsive to the fifth pulse for gating the potential stored in the storage means in the form of a 10th pulse having a peak amplitude substantially equal to the magnitude of the stored potential; a second cathode follower for amplifying the 10th pulse and thereby producing an 11th pulse; second gating means responsive to the seventh pulse for gating the 11th pulse; cathode follower and noise discriminator means for receiving the 11th pulse when gated from the second gating means and for producing a 12th pulse which has an amplitude linearly related to the first pulse and similar duration, rise and decay times.

2. The system according to claim 1 wherein the seventh pulse commences when the sixth pulse ceases and wherein the duration of the seventh pulse is substantially equal to that of the first pulse.

3. A system for a logging borehole which traverses earth formations comprising: a sonde adapted for traversing a borehole; means, in said sonde, for generating a first electrical pulse representative of at least one parameter determinable in the borehole, said first electrical pulse having a relatively short duration period and a quickly rising as well as a quickly decaying period; a transmission line having a sending end and a receiving end, said sending end of said transmission line being situated in the borehole while the receiving end thereof is situated at the surface of the earth, said sending end of said transmission line being coupled to said means for generating said first electrical pulse whereby said first electrical pulse is transmitted along said transmission line to said receiving end thereof whereat said first pulse is received as a second pulse, said second pulse having a relatively long duration, an attenuated amplitude, a slow rise period and a slow decay period; a pick-off circuit having input terminal means and output terminal means, the input terminal means of said pick-off circuit being coupled to the receiving end of said transmission line; a linear amplifier having input terminal means and output terminal means, the input terminal means of said linear amplifier being coupled with the output terminal means of said pick-off circuit; delay means having input terminal means and output terminal means, the input terminal means of said delay means being coupled with the output terminal means of said linear amplifier; a first cathode follower amplifier having input terminal means and output terminal means, the input terminal means of said cathode follower amplifier being coupled with the output terminal means of said delay means; means for storing a voltage having input terminal means and output terminal means, the input terminal means of said means for storing a voltage being coupled with said output terminal means of said first cathode follower amplifier; first gate means having input terminal means and output terminal means, the input terminal means of said first gate means being coupled with the output terminal means of said means for storing a voltage; second cathode follower amplifier means having input terminal means and output terminal means, the input terminal means of said second cathode follower amplifier means being coupled with the output terminal means of said first gate means; second gate means having input terminal means and output terminal means, the input terminal means of said second gate means being coupled with the output terminal means of said second cathode follower amplifier; third cathode follower amplifier means having input terminal means and output terminal means, the input terminal means of said third cathode follower amplifier means being coupled with the output terminal means of said second gate means; noise discriminator means having input terminal means and output terminal means, said input terminal means of said noise discriminator means being coupled with said output terminal means of said third cathode follower amplifier means; pulse height analyzing means having input terminal means, the input terminal means of said pulse height analyzing means being coupled with the output terminal means of said noise discriminator means; Schmitt trigger means having input terminal means and output terminal means, the input terminal means of said Schmitt trigger means being coupled with said output terminal means of said linear amplifier; first multivibrator means having input terminal means and output terminal means, the input terminal means of said first multivibrator means being coupled with the output terminal means of said Schmitt trigger, said output terminal means of said first multivibrator means being coupled with the input terminal means of said first gate means; second multivibrator means having input terminal means and output terminal means, said input terminal means of said second multivibrator means being coupled with said output terminal means of said Schmitt trigger, third multivibrator means having input terminal means and output terminal means, said input terminal means of said third multivibrator means being coupled with said second multivibrator means, said output terminal means of said second multivibrator means being coupled with said input terminal means of said second gate means; and means for recording output signals from the output terminal means in correlation with the depth of said sonde in the borehole.

* * * * *